(12) United States Patent
Takehara et al.

(10) Patent No.: US 10,800,894 B2
(45) Date of Patent: Oct. 13, 2020

(54) RESIN SUPPLY MATERIAL, PREFORM, AND METHOD OF PRODUCING FIBER-REINFORCED RESIN

(71) Applicant: Toray Industries, Inc., Tokyo (JP)

(72) Inventors: Tomohiro Takehara, Ehime (JP); Satoshi Seike, Nagoya (JP); Masato Honma, Ehime (JP); Satomi Hiasa, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/553,683

(22) PCT Filed: Feb. 24, 2016

(86) PCT No.: PCT/JP2016/055388
§ 371 (c)(1),
(2) Date: Aug. 25, 2017

(87) PCT Pub. No.: WO2016/136793
PCT Pub. Date: Sep. 1, 2016

(65) Prior Publication Data
US 2018/0044488 A1  Feb. 15, 2018

(30) Foreign Application Priority Data

Feb. 27, 2015 (JP) .................. 2015-038131
Feb. 27, 2015 (JP) .................. 2015-038134

(51) Int. Cl.
*C08J 5/04* (2006.01)
*C08J 5/24* (2006.01)
(Continued)

(52) U.S. Cl.
CPC .............. *C08J 5/04* (2013.01); *B29C 70/443* (2013.01); *B29C 70/48* (2013.01); *C08J 5/042* (2013.01);
(Continued)

(58) Field of Classification Search
CPC .... B29C 70/443; B29C 70/48; C08J 2300/24; C08J 5/04; C08J 5/042; C08J 5/24;
(Continued)

(56) References Cited

U.S. PATENT DOCUMENTS

2011/0143110 A1  6/2011  Tsuchiya et al.
2012/0012263 A1  1/2012  Tsuchiya et al.
(Continued)

FOREIGN PATENT DOCUMENTS

CN    104245286 A    12/2014
EP    1 771 719 A1    11/2006
(Continued)

OTHER PUBLICATIONS

Extended European Search Report dated Oct. 1, 2018, of counterpart European Application No. 16755537.4.
(Continued)

*Primary Examiner* — Camie S Thompson
(74) *Attorney, Agent, or Firm* — DLA Piper LLP (US)

(57) ABSTRACT

A resin supply material used for press molding or vacuum-pressure molding of a fiber-reinforced resin includes a reinforcing fiber base material and a thermosetting resin, wherein a tensile rupture strain of the reinforcing fiber base material is 1% or more at temperature T, and/or a tensile strength of the reinforcing fiber base material is 0.5 MPa or more at the temperature T, wherein Temperature T is a temperature at which the viscosity of the thermosetting resin is minimum in heating of the thermosetting resin at a temperature elevation rate of 1.5° C./minute from 40° C.

30 Claims, 1 Drawing Sheet

(51) Int. Cl.
*B29C 70/48* (2006.01)
*B29C 70/44* (2006.01)

(52) U.S. Cl.
CPC .............. *C08J 5/24* (2013.01); *C08J 2300/24* (2013.01); *C08J 2363/00* (2013.01)

(58) Field of Classification Search
CPC ....... C08J 2363/00; C08L 63/00; C08L 63/04; Y10T 442/20
USPC .......................................... 442/59; 428/297.4
See application file for complete search history.

(56) References Cited

U.S. PATENT DOCUMENTS

| | | | |
|---|---|---|---|
| 2013/0217283 A1* | 8/2013 | Arai | ........................ C08G 59/28 442/59 |
| 2015/0050450 A1 | 2/2015 | Beraud et al. | |

FOREIGN PATENT DOCUMENTS

| | | |
|---|---|---|
| EP | 3 263 332 A1 | 1/2018 |
| EP | 3 263 630 A1 | 1/2018 |
| EP | 3 263 631 A1 | 1/2018 |
| JP | 2002-234078 A | 8/2002 |
| JP | 2003-11231 A | 1/2003 |
| JP | 2003-71856 A | 3/2003 |
| JP | 2005-22171 A | 1/2005 |
| JP | 2006-305867 A | 11/2006 |
| JP | 2008-246981 A | 10/2008 |
| JP | 2011-230341 A | 11/2011 |
| JP | 2013-188953 A | 9/2013 |
| WO | 2010/013645 A1 | 2/2010 |

OTHER PUBLICATIONS

The First Office Action dated Oct. 9, 2019 of counterpart Chinese Application No. 201680612103.7, along with an English translation.

* cited by examiner

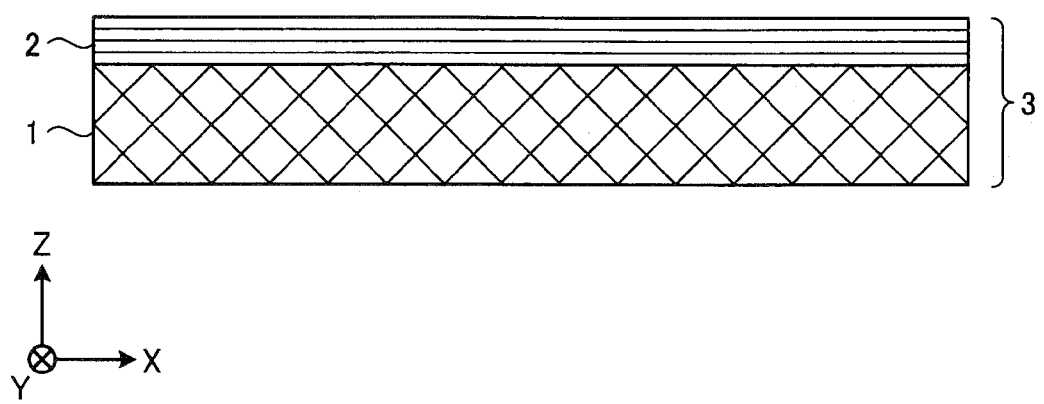

RESIN SUPPLY MATERIAL, PREFORM, AND METHOD OF PRODUCING FIBER-REINFORCED RESIN

TECHNICAL FIELD

This disclosure relates to a resin supply material, a preform, and a method of producing a fiber-reinforced resin.

BACKGROUND

Fiber-reinforced resins have an excellent specific strength and specific rigidity and are, therefore, widely used in applications such as aircraft, automobiles and sports. Particularly in industrial applications such as automobiles and sports, demand for high-speed molding processes for fiber-reinforced resins is growing.

Methods for high-speed molding of a fiber-reinforced resin include a RTM (resin transfer molding) method (Japanese Patent Laid-open Publication No. 2003-71856) and a RFI (resin film infusion) method (Japanese Patent Laid-open Publication No. 2003-11231). In the RTM method, first a dry base material (reinforcing fiber base material that does not contain a resin) is formed into a predetermined shape to produce a preform, the preform is disposed in a metal mold, and a liquid thermosetting resin having a low viscosity is injected into the metal mold, and heated and cured to mold a FRP (fiber-reinforced plastic) member. Since a dry base material is used, a three-dimensional complicated shape can be formed. In the RTM method, however, a process for injection of a resin is necessary and, therefore, molding subsidiary materials to be used in the injection process such as tubes and pipes are required. In addition, all the resin is not consumed for production of a molded article, and a large amount of the resin is wastefully left in an injection channel, resulting in an increase in cost. In a thermosetting resin, the resin cannot be reused, and cleaning in each batch requires lots of labor, resulting in an increase in cost. The RTM method also has the disadvantage that an injection port or a suction port leaves its trace on a molded member. Moreover, the RTM method has the problem that an operation site is often contaminated by a resin leaked out from a container or a pipe because a resin that is liquid at room temperature is used.

In the RFI method, a reinforcing fiber base material, and a resin film composed of an uncured thermosetting resin are disposed in a mold, and the resin film is melted by heating to be impregnated into the reinforcing fiber base material, and is then cured. Unlike the RTM method, the RFI method does not involve a thermosetting resin that is liquid at room temperature. Therefore, in the RFI method, an operation site is rarely contaminated, and time and labor for resin formulation can be saved. However, the RFI method has the problem that a thermosetting resin to be used in the RFI method has low rigidity in the form of a film and is, therefore, poor in handling characteristic so that lots of time and labor are required to dispose the film in a mold.

Japanese Patent Laid-open Publication No. 2002-234078 and Japanese Patent Laid-open Publication No. 2006-305867 each suggest a method of molding a fiber-reinforced resin using an impregnated body (described as a resin support in Japanese Patent Laid-open Publication No. 2002-234078 or a preform in Japanese Patent Laid-open Publication No. 2006-305867) in which a thermosetting resin that is liquid at room temperature is absorbed into a support. Japanese Patent Laid-open Publication No. 2008-246981 suggests a method of molding a fiber-reinforced resin using a SMC (sheet molding compound).

In Japanese Patent Laid-open Publication No. 2002-234078 and Japanese Patent Laid-open Publication No. 2006-305867, a structural member can be produced by laminating an impregnated body with a dry base material, then heating and pressurizing the resulting laminate in a mold to impregnate a reinforcing fiber base material with a thermosetting resin in the impregnated body, and also the impregnated body may be excellent in handling characteristic because a support is impregnated with a resin. However, there is the problem that a fiber-reinforced resin prepared by such a molding method does not have desired properties because a support to be used has poor dynamic characteristics, and an applicable viscosity range is narrow.

The molding method in Japanese Patent Laid-open Publication No. 2008-246981 is used for the purpose of obtaining a molded article with smoothed proper external appearance quality by interposing a resin-non-impregnated base material between prepreg layers to suppress generation of depressions on a surface of the molded article. However, the molding method has the problem that a fiber base material that forms a prepreg has a small rupture strain and a small tensile strength and, therefore, in preparation of a molded article with a complicated shape, the base material fails to follow the shape, and ruptures during pressurization, leading to generation of sink marks on a surface layer of the molded article. The molding shrinkage factor of the prepreg is not isotropic in the plane and, therefore, it is necessary to give consideration to the lamination direction, leading to an increase in workload. The molding method also has the problem that a molded article has warpage, or a molded article with a complicated shape has wrinkles, and thus a molded article with a good external appearance cannot be obtained.

It could therefore be helpful to provide a resin supply material excellent in shape-imparting characteristics and dynamic characteristics, and a method of producing a fiber-reinforced resin using the resin supply material.

It could also be helpful to provide a resin supply material excellent in moldability and dynamic characteristics, and a method of producing a fiber-reinforced resin having reduced warpage and wrinkles by using the resin supply material.

SUMMARY

We thus provide:

A resin supply material is used for press molding or vacuum-pressure molding of a fiber-reinforced resin, the resin supply material including a reinforcing fiber base material and a thermosetting resin, wherein a tensile rupture strain of the reinforcing fiber base material is 1% or more at the following temperature T, and/or a tensile strength of the reinforcing fiber base material is 0.5 MPa or more at the following temperature T.

Temperature T: temperature at which the viscosity of the thermosetting resin is minimum in heating of the thermosetting resin at a temperature elevation rate of 1.5° C./minute from 40° C.

A resin supply material is used for press molding or vacuum-pressure molding of a fiber-reinforced resin, the resin supply material including a reinforcing fiber base material and a thermosetting resin, wherein a molding shrinkage factor ratio P expressed by formula (I) is 1 to 1.5.

$$P = P_{MAX}/P_{MIN} \qquad (I)$$

$P_{MAX}$: maximum molding shrinkage factor of resin supply material
$P_{MIN}$: minimum molding shrinkage factor of resin supply material A resin supply material is used for press molding or vacuum-pressure molding of a fiber-reinforced resin, the resin supply material including a reinforcing fiber base material and a thermosetting resin, wherein the resin supply material meets any of Requirements (1), (2), (3):
a bending hardness of the reinforcing fiber base material at 25° C. is 50 mN·cm or less (1),
a bending length ratio F of the reinforcing fiber base material is within the range of 1 to 1.5, the bending length ratio F being expressed by formula (III):

$$F=F_{MAX}/F_{MIN} \quad (III)$$

$F_{MAX}$: maximum bending length of reinforcing fiber base material
$F_{MIN}$: minimum bending length of reinforcing fiber base material (2), a bending elastic modulus ratio E of a cured product obtained by curing the resin supply material is within the range of 1 to 1.5, the bending elastic modulus ratio E being expressed by formula (IV):

$$E=E_{MAX}/E_{MIN} \quad (IV)$$

$E_{MAX}$: maximum bending elastic modulus of cured product of resin supply material
$E_{MIN}$: minimum bending elastic modulus of cured product of resin supply material (3).

A preform includes the resin supply material, and a base material.

A preform includes the resin supply material, and at least one base material selected from a sheet-shaped base material, a cloth-shaped base material and a porous base material.

A method of producing a fiber-reinforced resin includes the step of molding a fiber-reinforced resin by heating and pressurizing the preform to supply a thermosetting resin from the resin supply material to the base material.

We provide a resin supply material excellent in shape-imparting characteristics and dynamic characteristics, and a method of producing a fiber-reinforced resin using the resin supply material.

We also provide a resin supply material excellent in moldability and dynamic characteristics, and a method of producing a fiber-reinforced resin having reduced warpage and wrinkles by using the resin supply material.

BRIEF DESCRIPTION OF THE DRAWING

FIG. 1 is a schematic view showing a configuration of a preform.

DESCRIPTION OF REFERENCE SIGNS

1: Resin supply material
2: Base material
3: Preform

DETAILED DESCRIPTION

First Construction

We provide a resin supply material including a reinforcing fiber base material and a thermosetting resin. As shown in FIG. 1, a resin supply material1 allows a fiber-reinforced resin to be molded by laminating the resin supply material1 and a base material2 to prepare a preform 3, heating and pressurizing the preform 3 in, for example, a closed space, and supplying a thermosetting resin from the resin supply material1 to the base material2.

The preform means a laminate obtained by laminating and integrating the resin supply material1 and the base material2, and examples thereof may include a sandwich laminate in which an outermost layer of a laminate obtained by laminating and integrating a predetermined number of resin supply materials1 is sandwiched between base materials 2; an alternating laminate in which resin supply materials1 and base materials2 are alternately laminated; and a combination thereof. Formation of a preform beforehand is preferred because the base material2 can be quickly and more uniformly impregnated with the thermosetting resin in a process for production of a fiber-reinforced resin.

In a method of producing a fiber-reinforced resin using the resin supply material1, it is necessary to supply a thermosetting resin from the resin supply material1 to the base material2 while preventing generation of voids as much as possible and, therefore, press molding or vacuum-pressure molding is preferred. A mold for molding may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside).

The resin supply material1 includes a reinforcing fiber base material and a thermosetting resin, and is preferably in the form of a sheet. The thickness of the sheet is preferably 0.5 mm or more, more preferably 1 mm or more, still more preferably 1.5 mm or more from the viewpoint of a resin supply characteristic and dynamic characteristics. From the viewpoint of a handling characteristic and moldability, the thickness of the sheet is preferably 100 mm or less, more preferably 60 mm or less, still more preferably 30 mm or less.

A fiber weight content Wfi (before molding) of the resin supply material1 as expressed by the following formula is preferably 0.5% or more, more preferably 1.0% or more, still more preferably 1.5% or more. When the fiber weight content Wfi is less than 0.5%, the amount of the thermosetting resin is excessively large with respect to the reinforcing fiber base material, the resin cannot be supported on the reinforcing fibers, or a large amount of the resin flows to the outside during molding. The fiber weight content Wfi (before molding) of the resin supply material1 as expressed by the following formula is preferably 30% or less, more preferably 22% or less, still more preferably 15% or less. When the fiber weight content Wfi is more than 30%, the fiber-reinforced resin may have a large number of voids due to poor impregnation of the resin into the base material2. The fiber weight content Wfi is determined in accordance with JIS K7075 (Fiber Content and Void Content Test Methods for Carbon Fiber-Reinforced Plastic, 1991).

The fiber weight content Wfi of the resin supply material1 can be determined in accordance with JIS K7075 (Fiber Content and Void Content Test Methods for Carbon Fiber-Reinforced Plastic, 1991) using only the resin supply material1 taken out by polishing or cutting a preform including the resin supply material1. When it is difficult to measure the fiber weight content Wfi in an uncured state, a resin supply material cured in a non-pressurized state $$Wfi=Wf1/(Wf1+Wr1)\times 100(\%)$$

Wf1: fiber weight (g) in resin supply material
Wr1: resin weight (g) in resin supply material.

A fiber volume content Vfi (before molding) of the resin supply material1 as expressed by the following formula is preferably 0.3% or more, more preferably 0.6% or more, still more preferably 1.0% or more. When the fiber volume content Vfi is less than 0.3%, the amount of the thermosetting resin is excessively large with respect to the reinforcing fiber base material, the resin cannot be supported on the reinforcing fibers, or a large amount of the resin flows to the outside during molding. The fiber volume content Vfi (before molding) of the resin supply material1 as expressed by the following formula is preferably 20% or less, more preferably 15% or less, still more preferably 10% or less. When the fiber volume content Vfi is more than 20%, the fiber-reinforced resin may have a large number of voids due to poor impregnation of the resin into the base material2. The fiber volume content Vfi is determined in accordance with JIS K7075 (Fiber Content and Void Content Test Methods for Carbon Fiber-Reinforced Plastic, 1991). In place of the above-mentioned method of determining the fiber volume content Vfi, the fiber volume content Vfi may be determined from the following formula using a thickness T1 (unit: mm, measured value), a weight per unit area Faw of the reinforcing fiber base material (unit: g/m$^2$, catalog value or measured value), and a density p of the reinforcing fiber base material (unit: g/cm$^3$, catalog value or measured value). The thickness T1 is determined from an average of thicknesses of the resin supply material1 at randomly selected ten points within an area of 50 mm (length)×50 mm (width) using a microscope. The thickness direction is a direction orthogonal to a contact surface with the base material2 to be used in the preform.

The fiber volume content Vfi of the resin supply material1 can be determined in accordance with JIS K7075 (Fiber Content and Void Content Test Methods for Carbon Fiber-Reinforced Plastic, 1991) using only the resin supply material1 taken out by polishing or cutting a preform including the resin supply material1. When it is difficult to measure the fiber volume content Vfi in an uncured state, a resin supply material cured in a non-pressurized state $$Vfi=Vf1/Vp1\times 100(\%)$$

Vf1: fiber volume (mm$^3$) in resin supply material
Vp1: volume (mm$^3$) of resin supply material $$Vfi=Faw/\rho/T1/10(\%)$$

Faw: weight per unit area (g/m$^2$) of reinforcing fiber base material
ρ: density (g/cm$^3$) of reinforcing fiber base material
T1: thickness (mm) of resin supply material.

The reinforcing fiber base material will now be described. The reinforcing fiber base material to be used in the resin supply material1 may be one composed of continuous fibers to be used in a unidirectional base material, a fabric base material or the like, but the reinforcing fiber base material is preferably one composed of discontinuous fibers from the viewpoint of a resin supply characteristic. The reinforcing fiber is preferably in the form of a web in which fibers are dispersed in a bundle shape or a monofilament shape, and gaps to be impregnated with a resin exist between the fibers. The form and the shape of the web are not limited and, for example, carbon fibers may be mixed with organic fibers, an organic compound or an inorganic compound, carbon fibers may be sealed together by other component, or carbon fibers may be bonded to a resin component. As a preferred form for easily producing a web in which fibers are dispersed, mention may be made of, for example, a base material which is in the form of a non-woven fabric obtained by a dry method or a wet method and in which carbon fibers are sufficiently opened, and monofilaments are bonded together by a binder composed of an organic compound.

The tensile rupture strain of the reinforcing fiber base material in the resin supply material1 is preferably 1% or more, more preferably 5% or more, still more preferably 10% or more at a temperature T. The temperature T is a temperature at which the viscosity of the thermosetting resin is minimum in heating of the thermosetting resin in the resin supply material1 at a temperature elevation rate of 1.5° C./minute from 40° C. When there are a plurality of temperatures at which the viscosity of the thermosetting set is minimum, the lowest of these temperatures is set to the temperature T. A method of measuring a viscosity of the thermosetting resin will be described later. When the tensile rupture strain is less than 1%, it may be unable to attain a favorable external appearance due to generation of sink marks on a surface layer of a molded article at a ruptured area because in molding of a fiber-reinforced resin using the resin supply material1, the reinforcing fiber base material is easily ruptured, an thus there arises a difference between the curing shrinkage factors of the fiber-reinforced resin in the thickness direction at the ruptured area and at other area. The tensile rupture strain is determined in accordance with JIS K6400-5 (2012).

The tensile strength of the reinforcing fiber base material in the resin supply material1 is preferably 0.5 MPa or more, more preferably 1 MPa or more, still more preferably 2 MPa or more at the temperature T. When the tensile strength is less than 0.5 MPa, it may be unable to attain a favorable external appearance due to generation of sink marks on a surface layer of a molded article at a ruptured area because in molding of a fiber-reinforced resin using the resin supply material1, the reinforcing fiber base material is easily ruptured, and thus there arises a difference between the curing shrinkage factors of the fiber-reinforced resin in the thickness direction at the ruptured area and at other area. The tensile strength is determined in accordance with JIS K6400-5 (2012). It is preferred to satisfy the requirement for the tensile rupture strain as well as the requirement for the tensile strength of the reinforcing fiber base material to suppress generation of sink marks in a surface layer of a molded article at a ruptured area to obtain a molded article having a favorable external appearance.

Reinforcing fibers in the reinforcing fiber base material form a strong network, and have high strength, and a spring back characteristic as described later. When the resin supply material 1 which includes a reinforcing fiber base material having high strength and a spring back characteristic is used, a fiber-reinforced resin having excellent shape-imparting characteristics and high strength is easily obtained (i.e. the fiber volume content is easily increased). The spring back force can be defined as a compressive stress (spring back force) at a porosity of 90% in accordance with JIS K6400-2 (Hardness and Compressive Deflection—Method A-1, 2012). The compressive stress of the reinforcing fiber base material at a porosity of 90% is preferably 5 kPa or more, more preferably 50 kPa or more, still more preferably 100 kPa or more.

As a kind of reinforcing fibers in the reinforcing fiber base material, carbon fibers are preferred, but the reinforcing fibers may be glass fibers, aramid fibers, metal fibers or the like. The carbon fibers are not particularly limited, and for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 µm or more, more preferably 2 µm or more, still more preferably 4 µm or more. The monofilament diameter of the reinforcing fibers is preferably 20 µm or less, more preferably 15 µm or less, still more preferably 10 µm or less. The strand strength of the reinforcing fibers is preferably 3.0 GPa or more, more preferably 4.0 GPa or more, still more preferably 4.5 GPa or more. The strand elastic modulus of the reinforcing fibers is preferably 200 GPa or more, more preferably 220 GPa or more, still more preferably 240 GPa or more. When the strand strength or the elastic modulus of the reinforcing fibers are less than 3.0 GPa or less than 200 GPa, respectively, it may be unable to obtain desired characteristics as a fiber-reinforced resin.

The mean fiber length of reinforcing fibers in the reinforcing fiber base material is preferably 0.1 mm or more, more preferably 1 mm or more, still more preferably 2 mm or more. The mean fiber length of reinforcing fibers in the reinforcing fiber base material is preferably 100 mm or less, more preferably 50 mm or less, still more preferably 10 mm or less. Examples of the method of measuring the mean fiber length include a method in which reinforcing fibers are directly extracted from a reinforcing fiber base material; and a method in which a prepreg is dissolved using a solvent capable of dissolving only a resin of the prepreg, and the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, measuring the lengths of the reinforcing fibers to the order of 1 µm using an optical microscope, and determining fiber lengths and ratios thereof. In a comparison between the method in which reinforcing fibers are directly extracted from a reinforcing fiber base material and the method in which reinforcing fibers are extracted from a prepreg by a burning method or a dissolution method, there is no significant difference between the results obtained by the former method and the latter method as long as conditions are appropriately selected.

"Having a spring back characteristic" as described above means meeting the following requirement: $t_1 < t_2 \leq t_0$ where $t_0$ is an initial thickness of the reinforcing fiber base material; $t_1$ is a thickness of the reinforcing fiber base material when the reinforcing fiber base material is pressurized at 0.1 MPa; and $t_2$ is a thickness of the reinforcing fiber base material when a load is applied to the reinforcing fiber base material, and the load is then removed. The thickness change ratio R ($=t_0/t_1$) is preferably 1.1 or more, more preferably 1.3 or more, still more preferably 1.5 or more. When the thickness change ratio R is less than 1.1, it may be unable to obtain a molded product having a desired shape due to deterioration of the resin supply characteristic and shape formability. The thickness change ratio R is preferably 10 or less, more preferably 7 or less, still more preferably 4 or less. When the thickness change ratio $t_0/t_1$ is more than 10, the handling characteristic of the resin supply material may be deteriorated in impregnation of a resin. The method of measuring an initial thickness and a thickness when a load is removed is not particularly limited and, for example, the thickness can be measured using a micrometer, a caliper, a three-dimensional measurement device or a laser displacement meter, or by microscopic observation. In microscopic observation, the reinforcing fiber base material may be observed directly, or observed after the reinforcing fiber base material is embedded in a thermosetting resin, and a cross section is polished. The method of measuring the thickness when a load is applied is not particularly limited and, for example, the thickness can be measured by applying a load to the reinforcing fiber base material using a bending tester or a compression tester, and reading a displacement.

The orientation of fibers on an X-Y plane of the reinforcing fiber base material (the X-Y plane is in a base material plane, and an axis orthogonal to a certain axis (X axis) in the base material plane is a Y axis, and an axis extending in a thickness direction of the base material (i.e. a direction vertical to the base material plane) is a Z axis) is preferably isotropic. An average of fiber two-dimensional orientation angles on the X-Y plane as measured by a measurement method as described later is preferably 5 degrees or more, more preferably 20 degrees or more, still more preferably 30 degrees or more. The closer to the ideal angle: 45 degrees, the better. When the average of fiber two-dimensional orientation angles is less than 5 degrees, it may be necessary to consider a lamination direction of the resin supply material because the dynamic characteristics of the fiber-reinforced resin significantly vary depending on the direction.

An average of fiber two-dimensional orientation angles on a plane orthogonal to the X-Y plane of the reinforcing fiber base material as measured by a measurement method as described later is preferably 5 degrees or more, more preferably 10 degrees or more, still more preferably 20 degrees or more to improve the resin support characteristic. The average of fiber two-dimensional orientation angles on the plane orthogonal to the X-Y plane of the reinforcing fiber base material is preferably 85 degrees or less, more preferably 80 degrees or less, still more preferably 75 degrees or less. When the average of fiber two-dimensional orientation angles is less than 5 degrees, or more than 85 degrees, fibers may be in close contact with one another, resulting in deterioration of the resin support characteristic.

A mass per unit area of a reinforcing fiber base material preferably used is preferably 1 g/m² or more, more preferably 10 g/m² or more, still more preferably 30 g/m² or more. When the mass per unit area is less than 1 g/m², the resin support characteristic may be deteriorated, thus making it unable to secure a resin amount required for molding. Further, in the process of producing the reinforcing fiber base material or the resin supply material1, the handling characteristic may be poor, leading to deterioration of workability.

Preferably, fibers in the reinforcing fiber base material that is preferably used are bonded together by a binder. Accordingly, the handling characteristic and productivity of the reinforcing fiber base material, and workability are improved, and the network structure of the reinforcing fiber base material can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 0.01% or more, more preferably 0.1% or more, still more preferably 1% or more. The attaching amount of the binder is preferably 20% or less, more preferably 15% or less, still more preferably 10% or less. When the attaching amount of the binder is more than 20%, much time may be required in a drying process, or resin impregnability may be deteriorated. When the attaching amount of the binder is less than 0.01%, it may be difficult to maintain the form of the reinforcing fiber base material, leading to deterioration of the handling characteristic. A method of measuring the attaching amount of the binder will be described later.

The thermosetting resin to be used in the resin supply material1 will be described. The viscosity of the thermosetting resin for use during impregnation is preferably 1000 Pa·s or less, more preferably 100 Pa·s or less, still more preferably 10 Pa·s or less. When the viscosity is more than 1000 Pa·s, voids may be generated in the resulting fiber-reinforced resin because the later-described base material2 is not sufficiently impregnated with the thermosetting resin.

Examples of the kind of thermosetting resin preferably used include epoxy resins, vinyl ester resins, phenol resins, thermosetting polyimide resins, polyurethane resins, urea resins, melamine resins and bismaleimide resins. In addition to a single epoxy resin, a copolymer of an epoxy resin and a thermosetting resin, a modified product, a resin obtained by blending two or more kinds of resins and so on can be used.

The base material2 to be used in the preform is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers or the like is preferably used. The continuous fiber means a reinforcing fiber in which a reinforcing fiber bundle is drawn and aligned in a continuous state without cutting the reinforcing fiber into short fibers. The form and the arrangement of reinforcing fibers to be used in the base material2 can be appropriately selected from continuous fiber forms such as a unidirectionally drawn and aligned long fiber, a fabric, a tow and a roving. The number of filaments in one fiber bundle to be used in the base material2 is preferably 500 or more, more preferably 1500 or more, still more preferably 2500 or more. The number of filaments in one fiber bundle is preferably 150000 or less, more preferably 100000 or less, still more preferably 70000 or less.

To obtain a fiber-reinforced resin having high dynamic characteristics, it is preferred that a fabric base material or unidirectional base material composed of continuous reinforcing fibers is used as the base material2, and to increase the thermosetting resin impregnation rate to improve productivity of the fiber-reinforced resin, it is preferred that a mat base material composed of discontinuous fibers is used as the base material2.

The base material2 may be a single base material, or one obtained by laminating a plurality of base materials, or may be one obtained by partially laminating base materials or laminating different base materials according to characteristics required for the preform or the fiber-reinforced resin. Examples of the method of producing a fiber-reinforced resin using the resin supply material1 include the following method. First, the preform 3 including the resin supply material1, and at least one base material2 selected from a sheet-shaped base material, a cloth-shaped base material and a porous base material is prepared, and set on a metal mold. The resin supply material1 is softened on the metal mold at a high temperature, and the thermosetting resin is then supplied to the base material2 by pressurization. The pressurization method is preferably press molding or vacuum-pressure molding. For the thermosetting resin, the temperature during supply of the resin and the temperature during curing may be the same, or different. A mold of molding may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside as described above). For the thermosetting resin, heating to a temperature at which the thermosetting resin is cured is performed after molding as necessary in addition to heating during molding so that the thermosetting resin is cured to obtain a fiber-reinforced resin.

Method of Measuring Viscosity of Thermosetting Resin

Viscosity of the thermosetting resin was measured under the following conditions. A dynamic elasticity measurement apparatus ARES-2KFRTN1-FCO-STD (manufactured by TA Instruments) was used, and flat parallel plates with a diameter of 40 mm were used as upper and lower measurement tools. The thermosetting resin was set such that a distance between the upper and lower tools was 1 mm, the viscosity was measured in a twist mode (measurement frequency: 0.5 Hz) at a temperature elevation rate of 1.5° C./minute with the measurement start temperature set to 40° C., and the temperature at which the viscosity of the resin was minimum was set to T (° C.).

Method of Deriving Average of Fiber Two-Dimensional Orientation Angles on X-Y Plane The average of fiber two-dimensional orientation angles on the X-Y plane is measured in the following steps I and II. As described above, the X axis, the Y axis and the Z axis are mutually orthogonal, the X-Y plane is in the base material plane, and the Z axis extends in the thickness direction of the base material.

I. An average of two-dimensional orientation angles with all reinforcing fiber monofilaments orthogonally crossing randomly selected reinforcing fiber monofilaments on the X-Y plane is measured. If there are many reinforcing fiber monofilaments crossing the reinforcing fiber monofilaments, an average measured for randomly selected 20 crossing reinforcing fiber monofilaments may be used alternatively.

II. The measurement in the step I is repeated five times for other reinforcing fiber monofilaments, and an average of the measured values is calculated as an average of fiber two-dimensional orientation angles.

The method of measuring an average of fiber two-dimensional orientation angles from the resin supply material1 is not particularly limited, and mention may be made of, for example, a method in which the orientation of reinforcing fiber monofilaments is observed from a surface of the resin supply material1. It is preferred to polish the surface of the resin supply material1 to expose the fibers for more easily observing the reinforcing fibers. Mention may also be made of, for example, a method in which the orientation of reinforcing fibers is observed using light passing through the resin supply material1. It is preferred to thinly slice the resin supply material1 to more easily observe the reinforcing fibers. Mention may also be made of, for example, a method in which the resin supply material1 is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing reinforcing fiber monofilaments.

When it is difficult to perform measurement by the above-mentioned methods, mention may be made of, for example, a method in which the orientation of reinforcing fibers is observed after a resin is removed without collapsing the structure of the reinforcing fibers. For example, measurement can be performed in the following manner: the resin supply material1 is sandwiched between two stainless meshes, and fixed by a screw so that the resin supply material1 does not move, a resin component is then burned off, and the resulting reinforcing fiber base material is observed with an optical microscope or an electron microscope.

Method of Deriving Average of Fiber Two-Dimensional Orientation Angles on Plane Orthogonal to X-Y plane The average of fiber two-dimensional orientation angles on a plane to the X-Y plane is measured in the following steps I and II.

I. Fiber two-dimensional orientation angles of randomly selected reinforcing fiber monofilaments on a plane orthogonal to the X-Y plane are measured. The fiber two-dimensional orientation angle is set to 0 degree when parallel to the Z axis, and to 90 degrees when vertical to the Z axis. Accordingly, the fiber two-dimensional orientation angle ranges from 0 degree to 90 degrees.

II. The measurement in the step I is performed for total 50 reinforcing fiber monofilaments, and an average of the measured values is calculated as an average of fiber two-dimensional orientation angles on a plane orthogonal to the X-Y plane.

The method of measuring an average of fiber inclination angles from the resin supply material1 is not particularly limited, and mention may be made of, for example, a method in which the orientation of reinforcing fiber monofilaments is observed from the Y-Z plane (Z-X plane) of the resin supply material1. It is preferred to polish a cross section of the resin supply material1 to expose the fibers for more easily observing the reinforcing fibers. Mention may also be made of, for example, a method in which the orientation of reinforcing fibers is observed using light passing through the resin supply material1. It is preferred to thinly slice the resin supply material1 for more easily observing the reinforcing fibers. Mention may also be made of, for example, a method in which the resin supply material1 is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing reinforcing fiber monofilaments.

Method of Measuring Attaching Amount of Binder

Carbon fibers are weighed ($W_1$), and then left standing for 15 minutes in an electric furnace set at a temperature of 450° C. in a nitrogen flow at a rate of 50 liters/minute so that a binder is fully thermally decomposed. The carbon fibers are transferred to a container in a dry nitrogen flow at 20 liters/minute, cooled for 15 minutes, and then weighed ($W_2$), and a binder attaching amount is determined from the following formula $$\text{binder attaching amount (\%)} = (W_1 - W_2)/W_1 \times 100.$$

EXAMPLES

Reference Example 1 (Reinforcing Fibers (Carbon Fibers) in Reinforcing Fiber Base Material)

From a copolymer mainly composed of PAN, continuous carbon fibers including total 12,000 monofilaments were prepared by performing spinning, a firing treatment and a surface oxidation treatment. The continuous carbon fibers had characteristics as shown below.
Monofilament diameter: 7 μm
Mass per unit length: 0.8 g/m
Specific gravity: 1.8
Tensile strength: 4600 MPa
Tensile elastic modulus: 220 GPa Reference Example 2 (Thermosetting Resin (Epoxy Resin (1))

An epoxy resin (1) was prepared using 40 parts by mass of "JER (registered trademark)" 1007 (manufactured by Mitsubishi Chemical Corporation), 20 parts by mass of "JER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator. The temperature T at which the viscosity of the epoxy resin (1) was minimum was 110° C.

Reference Example 3 (Epoxy Resin Film)

Using a reverse roll coater, the epoxy resin (1) prepared in Reference Example 2 was applied onto a release paper to prepare resin films with masses per unit area of 37, 74 and 100 g/m², respectively.

Reference Example 4 (Reinforcing Fiber Base Material (1))

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. About 7% by mass of a polyamide dispersion liquid (Hydrosize PA845, MICHELMAN, Inc.) as a binder was deposited on the carbon fiber base material subjected to papermaking, and a heat treatment was performed in a drying furnace at 240° C. for about 20 minutes to prepare a desired reinforcing fiber base material (1). The mean fiber length was 6.0 mm, the average of fiber two-dimensional orientation angles on the X-Y plane was 45.1°, and the average of fiber two-dimensional orientation angles on a plane orthogonal to the X-Y plane was 82.1°. A tension test for the reinforcing fiber base material (1) was conducted at 110° C. in accordance with JIS K6400-5 (Soft Foamed Material-Method for Determination of Physical Properties-, 2012), and the result showed that the tensile strength was 3.0 MPa, and the rupture strain was 1.2%.

Reference Example 5 (Reinforcing Fiber Base Material (2))

The carbon fibers obtained in Reference Example 1 were cut to a length of 50 mm by a cartridge cutter, and dropped and scattered uniformly in the form of monofilaments. About 7% by mass of a polyamide dispersion liquid (HYDROSIZE (registered trademark) PA845, MICHELMAN, Inc.) as a binder was deposited on the obtained reinforcing fiber base material (2), and a heat treatment was performed in a drying furnace at 240° C. for about 20 minutes to prepare a desired reinforcing fiber base material (2). The average of fiber two-dimensional orientation angles on the X-Y plane was 54.10, and the average of fiber two-dimensional orientation angles on a plane orthogonal to the X-Y plane was 85.3°.

A tension test for the reinforcing fiber base material (2) was conducted at 110° C. in accordance with J1S K6400-5 (Soft Foamed Material-Method for Determination of Physical Properties-, 2012), and the result showed that the tensile strength was 5.4 MPa, and the rupture strain was 5.2%.

Reference Example 6 (Reinforcing Fiber Base Material (3))

The carbon fibers obtained in Reference Example 1 were cut to a length of 200 mm by a cartridge cutter, and curvedly dropped and scattered uniformly in the form of monofilaments. About 7% by mass of a polyamide dispersion liquid (HYDROSIZE (registered trademark) PA845, MICHELMAN, Inc.) as a binder was deposited on the obtained reinforcing fiber base material (3), and a heat treatment was performed in a drying furnace at 240° C. for about 20 minutes to prepare a desired reinforcing fiber base material (3).

A tension test for the reinforcing fiber base material (3) was conducted at 110° C. in accordance with JIS K6400-5 (Soft Foamed Material-Method for Determination of Physical Properties-, 2012), and the result showed that the tensile strength was 6.1 MPa, and the rupture strain was 12%.

Reference Example 7 (Reinforcing Fiber Base Material (4))

The carbon fibers obtained in Reference Example 1 were cut to a length of 6.0 mm by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. A tension test for the reinforcing fiber base material (4) was conducted at 110° C. in accordance with JIS 0.1(6400-5 (Soft Foamed Material-Method for Determination of Physical Properties-, 2012), and the result showed that the tensile strength was 0.2 MPa, and the rupture strain was 0.5%.

Reference Example 8 (Reinforcing Fiber Base Material (5))

The carbon fibers obtained in Reference Example 1 were cut to a length of 25 mm by a cartridge cutter, and dropped and scattered uniformly in the form of bundles. About 5% by mass of a polyvinyl alcohol aqueous solution (KURARAY POVAL, manufactured by KURARAY CO., LTD) as a binder was deposited on the obtained reinforcing fiber base material (5), and dried in a drying furnace at 140° C. for 1 hour to prepare a desired reinforcing fiber base material (5).

A tension test for the reinforcing fiber base material (5) was conducted at 110° C. in accordance with JIS K6400-5 (Soft Foamed Material-Method for Determination of Physical Properties-, 2012), and the result showed that the tensile strength was 0.4 MPa, and the rupture strain was 0.7%.

Reference Example 9 (Resin Supply Material (1))

The reinforcing fiber base material (1) obtained in Reference Example 4 was impregnated with the epoxy resin (1) prepared in Reference Example 2 so that a resin supply material (1) was prepared. The impregnation process includes the following steps.

(1) About 1500 g/m² of the epoxy resin film (size: 20×20 cm²) obtained in Reference Example 3 is disposed on the reinforcing fiber base material (weight per unit area: 100 g/m², size: 20×20 cm²) obtained in Reference Example 4.

(2) Heating is performed at 0.1 MPa and 70° C. for about 1.5 hours.

The resin supply material (1) had a thickness of 14 mm.

Reference Example 10 (Resin Supply Material (2))

The reinforcing fiber base material (2) obtained in Reference Example 5 was impregnated with the epoxy resin (1) prepared in Reference Example 2 so that a resin supply material (2) was prepared. The impregnation process includes the following steps.

(1) About 1500 g/m² of the epoxy resin film (size: 20×20 cm²) obtained in Reference Example 3 is disposed on the reinforcing fiber base material (weight per unit area: 100 g/m², size: 20×20 cm²) obtained in Reference Example 5.

(2) Heating is performed at 0.1 MPa and 70° C. for about 1.5 hours.

The resin supply material (2) had a thickness of 13.5 mm.

Reference Example 11 (Resin Supply Material (3))

The reinforcing fiber base material (3) obtained in Reference Example 6 was impregnated with the epoxy resin (1) prepared in Reference Example 2 so that a resin supply material (3) was prepared. The impregnation process includes the following steps.

(1) About 1500 g/m² of the epoxy resin film (size: 20×20 cm²) obtained in Reference Example 3 is disposed on the reinforcing fiber base material (weight per unit area: 100 g/m², size: 20×20 cm²) obtained in Reference Example 6.

(2) Heating is performed at 0.1 MPa and 70° C. for about 1.5 hours.

The resin supply material (3) had a thickness of 14.3 mm.

Reference Example 12 (Resin Supply Material (4))

The reinforcing fiber base material (4) obtained in Reference Example 7 was impregnated with the epoxy resin (1) prepared in Reference Example 2 so that a resin supply material (4) was prepared. The impregnation process includes the following steps.

(1) About 1500 g/m² of the epoxy resin film (size: 20×20 cm²) obtained in Reference Example 3 is disposed on the reinforcing fiber base material (weight per unit area: 100 g/m², size: 20×20 cm²) obtained in Reference Example 7.

(2) Heating is performed at 0.1 MPa and 70° C. for about 1.5 hours.

The resin supply material (4) had a thickness of 14.1 mm.

Reference Example 13 (Resin Supply Material (5))

The reinforcing fiber base material (5) obtained in Reference Example 8 was impregnated with the epoxy resin (1) prepared in Reference Example 2 so that a resin supply material (5) was prepared. The impregnation process includes the following steps.

(1) About 1000 g/m² of the epoxy resin film (size: 20×20 cm²) obtained in Reference Example 3 is disposed on the reinforcing fiber base material (weight per unit area: 100 g/m², size: 20×20 cm²) obtained in Reference Example 8.

(2) Heating is performed at 0.1 MPa and 70° C. for about 1.5 hours.

The resin supply material (5) had a thickness of 10.0 mm.

Evaluation criteria on sink marks on the molded article in the following examples and comparative examples are as follows. A molded article is prepared using a metal mold having a uniform cavity thickness, a thickness of the molded article on a straight line passing through the center of gravity of the molded article is measured at ten points with equal intervals over an edge-to-edge distance, and an arithmetic average ($T_{ave}$) of the measured values is determined. The minimum thickness ($T_{min}$) among the thicknesses at the ten points is determined. A thickness change ratio of the fiber reinforcing resin is determined from the following formula $$\text{thickness change ratio (\%)} = (T_{ave} - T_{min})/T_{ave} \times 100.$$

Evaluation on sink marks in the fiber-reinforced resin was performed on the following criteria. A sample having a thickness change ratio of 5% or less was evaluated as having no sink marks (○), and a sample having a thickness change ratio of more than 5% was evaluated as having sink marks (x).

Example 1

A molded article having a curved surface shape with a curvature radius of 20 cm was prepared using the resin supply material (1) obtained in Reference Example 9 and a dry fabric (Cloth manufactured by Toray Industries, Inc., grade: C06343B, plain fabric, weight per unit area of carbon fibers: 198 g/m²). The molding process includes the following steps.

(1) Two dry fabric layers are disposed on each of front and back surfaces of the resin supply material (1) (size: 20×20 cm²) to provide a laminate.

(2) The laminate is disposed in a metal mold having a curved shape with a curvature radius of 20 cm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

The obtained molded article had no wrinkles on the surface layer, and the resin supply material had a uniform cross section thickness.

Example 2

A molded article having a curved surface shape with a curvature radius of 20 cm was prepared using the resin supply material (2) obtained in Reference Example 10 and a dry fabric (Cloth manufactured by Toray Industries, Inc., grade: C06343B, plain fabric, weight per unit area of carbon fibers: 198 g/m²). The molding process includes the following steps.

(1) Two dry fabric layers are disposed on each of front and back surfaces of the resin supply material (2) (size: 20×20 cm²) to provide a laminate.

(2) The laminate is disposed in a metal mold having a curved shape with a curvature radius of 20 cm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

The obtained molded article had no wrinkles on the surface layer, and the resin supply material had a uniform cross section thickness.

Example 3

A molded article having a curved surface shape with a curvature radius of 20 cm was prepared using the resin supply material (3) obtained in Reference Example 11 and a dry fabric (Cloth manufactured by Toray Industries, Inc., grade: C06343B, plain fabric, weight per unit area of carbon fibers: 198 g/m²). The molding process includes the following steps.

(1) Two dry fabric layers are disposed on each of front and back surfaces of the resin supply material (3) (size: 20×20 cm²) to provide a laminate.

(2) The laminate is disposed in a metal mold having a curved shape with a curvature radius of 20 cm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

The obtained molded article had no wrinkles on the surface layer, and the resin supply material had a uniform cross section thickness.

Comparative Example 1

A molded article having a curved surface shape with a curvature radius of 20 cm was prepared using the resin supply material (4) obtained in Reference Example 12 and a dry fabric (Cloth manufactured by Toray Industries, Inc., grade: C06343B, plain fabric, weight per unit area of carbon fibers: 198 g/m²). The molding process includes the following steps.

(1) Two dry fabric layers are disposed on each of front and back surfaces of the resin supply material (4) (size: 20×20 cm²) to provide a laminate.

(2) The laminate is disposed in a metal mold having a curved shape with a curvature radius of 20 cm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

The obtained molded article had wrinkles on the surface layer.

Comparative Example 2

A molded article having a curved surface shape with a curvature radius of 20 cm was prepared using the resin supply material (5) obtained in Reference Example 13 and a dry fabric (Cloth manufactured by Toray Industries, Inc., grade: C06343B, plain fabric, weight per unit area of carbon fibers: 198 g/m²). The molding process includes the following steps.

(1) Two dry fabric layers are disposed on each of front and back surfaces of the resin supply material (5) (size: 20×20 cm²) to provide a laminate.

(2) The laminate is disposed in a metal mold having a curved shape with a curvature radius of 20 cm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

The obtained molded article had wrinkles on the surface layer.

TABLE 1

| | | Resin supply material | | | | | |
| | | | Reinforcing fiber base material | | | | |
| | Reference Example | Resin supply material | Reference Example | Rupture strain at temperature T (%) | Tensile strength at temperature T (MPa) | Thickness of resin supply material (mm) | Sink marks in molded article |
| --- | --- | --- | --- | --- | --- | --- | --- |
| Example 1 | 9 | (1) | 4 | 1.2 | 3.0 | 14.0 | ○ |
| Example 2 | 10 | (2) | 5 | 5.2 | 5.4 | 13.5 | ○ |
| Example 3 | 11 | (3) | 6 | 12.0 | 6.1 | 14.3 | ○ |
| Comparative Example 1 | 12 | (4) | 7 | 0.5 | 0.2 | 14.1 | x |
| Comparative Example 2 | 13 | (5) | 8 | 0.7 | 0.4 | 10.0 | x |

Second Construction

We provide a resin supply material including a reinforcing fiber base material and a thermosetting resin. As shown in FIG. 1, a resin supply material1 allows a fiber-reinforced resin to be molded by laminating the resin supply material1 and a base material2 to prepare a preform 3, heating and pressurizing the preform 3 in, for example, a closed space, and supplying a thermosetting resin from the resin supply material1 to the base material2.

The preform means a laminate obtained by laminating and integrating the resin supply material1 and the base material2, and examples thereof may include a sandwich laminate in which an outermost layer of a laminate obtained by laminating and integrating a predetermined number of resin supply materials1 is sandwiched between base materials 2; an alternating laminate in which resin supply materials1 and base materials2 are alternately laminated; and a combination thereof. Formation of a preform beforehand is preferred because the base material2 can be quickly and more uniformly impregnated with the thermosetting resin in a process for production of a fiber-reinforced resin.

In a method of producing a fiber-reinforced resin using the resin supply material1, it is necessary to supply a thermosetting resin from the resin supply material1 to the base material2 while preventing generation of voids as much as possible and, therefore, it is preferred to carry out press molding or vacuum-pressure molding. A mold for molding may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside).

The resin supply material1 includes a reinforcing fiber base material and a thermosetting resin, and is preferably in the form of a sheet. The thickness of the sheet is preferably 0.5 mm or more, more preferably 1 mm or more, still more preferably 1.5 mm or more from the viewpoint of a resin supply characteristic and dynamic characteristics. From the viewpoint of a handling characteristic and moldability, the thickness of the sheet is preferably 100 mm or less, more preferably 60 mm or less, still more preferably 30 mm or less.

The molding shrinkage factor ratio P of the resin supply material1 is preferably 1 to 1.5, more preferably 1 to 1.4, still more preferably 1 to 1.3. When the molding shrinkage factor ratio P is more than 1.5, lamination of a plurality of resin supply materials in a wrong direction may make the molding shrinkage factor significantly asymmetric with respect to the center of the fiber-reinforced resin in the thickness direction, leading to occurrence of warpage in the fiber-reinforced resin. A method of measuring the molding shrinkage factor ratio P will be described later.

The bending elastic modulus ratio E of a cured product obtained by curing the resin supply material1 is preferably 1 to 1.5, more preferably 1 to 1.4, still more preferably 1 to 1.3. When the bending elastic modulus ratio E of the cured product is more than 1.5, a lamination design or base material layout with consideration given to anisotropy of the resin supply material may be required to obtain a fiber-reinforced resin having desired dynamic characteristics, leading to an increase in workload. A method of measuring the bending elastic modulus ratio E of the cured product will be described later. It is preferred to satisfy the requirement for the molding shrinkage factor ratio P as well as the requirement for the bending elastic modulus E of the cured product to easily mold a fiber-reinforced resin having reduced warpage and wrinkles.

A fiber weight content Wfi (before molding) of the resin supply material1 as expressed by the following formula is preferably 0.5% or more, more preferably 1.0% or more, still more preferably 1.5% or more. When the fiber weight content Wfi is less than 0.5%, the amount of the thermosetting resin is excessively large with respect to the reinforcing fiber base material, the resin cannot be supported on the reinforcing fibers, or a large amount of the resin flows to the outside during molding. The fiber weight content Wfi (before molding) of the resin supply material1 as expressed by the following formula is preferably 30% or less, more preferably 22% or less, still more preferably 15% or less. When the fiber weight content Wfi is more than 30%, the fiber-reinforced resin may have a large number of voids due to poor impregnation of the resin into the base material2. The fiber weight content Wfi is determined in accordance with JIS K7075 (Fiber Content and Void Content Test Methods for Carbon Fiber-Reinforced Plastic, 1991).

The fiber weight content Wfi of the resin supply material1 can be determined in accordance with JIS K7075 (Fiber Content and Void Content Test Methods for Carbon Fiber-Reinforced Plastic, 1991) using only the resin supply material1 taken out by polishing or cutting a preform including the resin supply material1. When it is difficult to measure the fiber weight content Wfi in an uncured state, a resin supply material cured in a non-pressurized state $$Wfi=Wf1/(Wf1+Wr1)\times 100(\%)$$

Wf1: fiber weight (g) in resin supply material
Wr1: resin weight (g) in resin supply material.

A fiber volume content Vfi (before molding) of the resin supply material1 as expressed by the following formula is preferably 0.3% or more, more preferably 0.6% or more, still more preferably 1.0% or more. When the fiber volume content Vfi is less than 0.3%, the amount of the thermosetting resin is excessively large with respect to the reinforcing fiber base material, the resin cannot be supported on the reinforcing fiber base material, or a large amount of the resin flows to the outside during molding. The fiber volume content Vfi (before molding) of the resin supply material1 as expressed by the following formula is preferably 20% or less, more preferably 15% or less, still more preferably 10% or less. When the fiber volume content Vfi is more than 20%, the fiber-reinforced resin may have a large number of voids due to poor impregnation of the resin into the base material2. The fiber volume content Vfi is determined in accordance with JIS K7075 (Fiber Content and Void Content Test Methods for Carbon Fiber-Reinforced Plastic, 1991). In place of the above-mentioned method of determining the fiber volume content Vfi, the fiber volume content Vfi may be determined from the following formula using a thickness T1 (unit: mm, measured value), a weight per unit area Faw of the reinforcing fiber base material (unit: g/m², catalog value or measured value), and a density ρ of reinforcing fibers in the reinforcing fiber base material (unit: g/cm³, catalog value or measured value). The thickness T1 is determined from an average of thicknesses of the resin supply material1 at randomly selected ten points within an area of 50 mm (length)×50 mm (width). The thickness direction is a direction orthogonal to a contact surface with the base material2 to be used in the preform.

The fiber volume content Vfi of the resin supply material1 can be determined in accordance with JIS K7075 (Fiber Content and Void Content Test Methods for Carbon Fiber-Reinforced Plastic, 1991) using only the resin supply material1 taken out by polishing or cutting a preform including the resin supply material1. When it is difficult to measure the fiber weight content Wfi in an uncured state, a resin supply material cured in a non-pressurized state $$Vfi=Vf1/Vp1\times 100(\%)$$

Vf1: fiber volume (mm³) in resin supply material
Vp1: volume (mm³) of resin supply material $$Vfi=Faw/\rho/T1/10(\%)$$

Faw: weight per unit area (g/m²) of reinforcing fiber base material
ρ: density (g/cm³) of reinforcing fiber base material
T1: thickness (mm) of resin supply material.

The reinforcing fiber base material will now be described. The reinforcing fiber base material to be used in the resin supply material1 may be a unidirectional base material or a fabric base material, but from the viewpoint of isotropy of the molding shrinkage factor and a resin supply characteristic, the reinforcing fiber base material is preferably a web in which fibers are dispersed in the form of bundles or monofilaments, and gaps for impregnation of a resin exist between fibers. The form and the shape of the web are not limited and, for example, reinforcing fibers may be mixed with organic fibers, an organic compound or an inorganic compound, reinforcing fibers may be sealed together by other component, or reinforcing fibers may be bonded to a resin component. As a preferred form for easily producing a web in which fibers are dispersed, mention may be made of, for example, a base material which is in the form of a non-woven fabric obtained by a dry method or a wet method and in which reinforcing fibers are sufficiently opened, and monofilaments are bonded together by a binder composed of an organic compound.

The bending hardness of the reinforcing fiber base material at 25° C. is preferably 50 mN·cm or less, more preferably 40 mN·cm or less, still more preferably 30 mN·cm or less. When the bending hardness of the reinforcing fiber base material at 25° C. is more than 50 mN·cm, wrinkles may be generated in the resin supply material1 during disposition of the resin supply material1 in a metal mold, and transferred to the surface layer of the fiber-reinforced resin. A method of measuring the bending hardness of the reinforcing fiber base material will be described later. It is preferred to satisfy the requirement for the bending elastic modulus E of the cured product and/or the requirement for the molding shrinkage factor ratio P as well as the requirement for the bending hardness of the reinforcing base material for easily molding a fiber-reinforced resin having reduced warpage and wrinkles.

The bending hardness of the reinforcing fiber base material at 70° C. is preferably 30 mN·cm or less, more preferably 25 mN·cm or less, still more preferably 20 mN·cm or less. When the bending hardness of the reinforcing fiber base material at 70° C. is more than 30 mN·cm, wrinkles may be generated in the resin supply material1 during impartment of a shape to the resin supply material1 in a metal mold, and transferred to the surface layer of the fiber-reinforced resin.

The bending length ratio F of the reinforcing fiber base material is preferably 1 to 1.5, more preferably 1 to 1.4, still more preferably 1 to 1.3. When the bending length ratio is more than 1.5, lamination of a plurality of resin supply materials in a wrong direction may make the rigidity significantly asymmetric with respect to the center of the fiber-reinforced resin in the thickness direction, leading to occurrence of warpage in the fiber-reinforced resin. A lamination design or base material layout with consideration given to anisotropy of the resin supply material may be required, leading to an increase in workload. A method of measuring the bending length ratio F of the reinforcing fiber base material will be described later. It is preferred to satisfy the requirement for the bending elastic modulus E of the cured product and/or the requirement for the molding shrinkage factor ratio P and/or the requirement for the bending hardness of the reinforcing fiber base material as well as the requirement for the bending hardness of the reinforcing base material to easily mold a fiber-reinforced resin having reduced warpage and wrinkles.

Reinforcing fibers in the reinforcing fiber base material form a strong network, and have high strength, and a spring back characteristic as described later. When the resin supply material 1 that includes a reinforcing fiber base material having high strength and a spring back characteristic is used, a fiber-reinforced resin having excellent moldability and high strength is easily obtained (i.e. the fiber volume content is easily increased). The spring back force can be defined as a compressive stress (spring back force) at a porosity of 90% in accordance with JIS K6400-2 (Hardness and Compressive Deflection—Method A-1, 2012). For the reinforcing fiber base material, the compressive stress at a porosity of 90% is preferably 5 kPa or more, more preferably 50 kPa or more, still more preferably 100 kPa or more.

As a kind of reinforcing fibers in the reinforcing fiber base material, carbon fibers are preferred, but the reinforcing fibers may be glass fibers, aramid fibers, metal fibers or the like. The carbon fibers are not particularly limited and, for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 µm or more, more preferably 2 µm or more, still more preferably 4 µm or more. The monofilament diameter of the reinforcing fibers is preferably 20 µm or less, more preferably 15 µm or less, still more preferably 10 µm or less. The strand strength of the reinforcing fibers is preferably 3.0 GPa or more, more preferably 4.0 GPa or more, still more preferably 4.5 GPa or more. The strand elastic modulus of the reinforcing fibers is preferably 200 GPa or more, more preferably 220 GPa or more, still more preferably 240 GPa or more. When the strand strength or the elastic modulus of the reinforcing fibers are less than 3.0 GPa or less than 200 GPa, respectively, it may be unable to obtain desired characteristics as a fiber-reinforced resin.

The mean fiber length of reinforcing fibers in the reinforcing fiber base material is preferably 0.1 mm or more, more preferably 1 mm or more, still more preferably 2 mm or more. The mean fiber length of reinforcing fibers in the reinforcing fiber base material is preferably 100 mm or less, more preferably 50 mm or less, still more preferably 10 mm or less. Examples of the method of measuring the mean fiber length include a method in which reinforcing fibers are directly extracted from a reinforcing fiber base material; and a method in which a prepreg is dissolved using a solvent capable of dissolving only a resin of the prepreg, and the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, measuring the lengths of the reinforcing fibers to the order of 1 µm using an optical microscope, and determining fiber lengths and ratios thereof. In a comparison between the method in which reinforcing fibers are directly extracted from a reinforcing fiber base material and the method in which reinforcing fibers are extracted from a prepreg by a burning method or a dissolution method, there is no significant difference between the results obtained by the former method and the latter method as long as conditions are appropriately selected.

"Having a spring back characteristic" as described above means meeting the following requirement: $t_1 < t_2 \leq t_0$ where to is an initial thickness of the reinforcing fiber base material; $t_1$ is a thickness of the reinforcing fiber base material when the reinforcing fiber base material is pressurized at 0.1 MPa; and $t_2$ is a thickness of the reinforcing fiber base material when a load is applied to the reinforcing fiber base material, and the load is then removed. The thickness change ratio R ($=t_0/t_1$) is preferably 1.1 or more, more preferably 1.3 or more, still more preferably 1.5 or more. When the thickness change ratio R is less than 1.1, it may be unable to obtain a molded product having a desired shape due to deterioration of the resin supply characteristic and shape formability. The thickness change ratio R is preferably 10 or less, more preferably 7 or less, still more preferably 4 or less. When the thickness change ratio R is more than 10, the handling characteristic of the resin supply material may be deteriorated in impregnation of a resin. The method of measuring an initial thickness and a thickness when a load is removed is not particularly limited and, for example, the thickness can be measured using a micrometer, a caliper, a three-dimensional measurement device or a laser displacement meter, or by microscopic observation. In microscopic observation, the reinforcing fiber base material may be observed directly, or observed after the reinforcing fiber base material is embedded in a thermosetting resin, and a cross section is polished. The method of measuring the thickness when a load is applied is not particularly limited and, for example, the thickness can be measured by applying a load to the reinforcing fiber base material using a bending tester or a compression tester, and reading a displacement.

The orientation of fibers on an X-Y plane of the reinforcing fiber base material (the X-Y plane is in a base material plane, and an axis orthogonal to a certain axis (X axis) in the base material plane is a Y axis, and an axis extending in a thickness direction of the base material (i.e. a direction vertical to the base material plane) is a Z axis) is preferably isotropic. An average of fiber two-dimensional orientation angles on the X-Y plane as measured by a measurement method as described later is preferably 30 degrees or more, more preferably 35 degrees or more, still more preferably 40 degrees or more. The average of fiber two-dimensional orientation angles is preferably 60 degrees or less, more preferably 55 degrees or less, still more preferably 50 degrees or less. The closer to the ideal angle: 45 degrees, the better. When the average of fiber two-dimensional orientation angles is less than 30 degrees or more than 60 degrees, the resin supply material1 may have an anisotropic molding shrinkage factor, resulting in occurrence of warpage in the fiber-reinforced resin, or it may be unable to obtain a fiber-reinforced resin having desired dynamic characteristics.

A mass per unit area of a reinforcing fiber base material that is preferably used is preferably 1 g/m$^2$ or more, more preferably 10 g/m$^2$ or more, still more preferably 30 g/m$^2$ or more. When the mass per unit area is less than 1 g/m$^2$, the resin support characteristic may be deteriorated, thus making it unable to secure a resin amount required for molding. Further, in the process of producing the reinforcing fiber base material or the resin supply material1, the handling characteristic may be poor, leading to deterioration of workability.

Preferably, fibers in the reinforcing fiber base material that is preferably used are bonded together by a binder. Accordingly, the handling characteristic and productivity of the reinforcing fiber base material, and workability are improved, and the network structure of the reinforcing fiber base material can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 20% or less, more preferably 15% or less, still more preferably 10% or less. When the attaching amount of the binder is more than 20%, much time may be required in a drying process, or it may be difficult to mold a complicated shape. A method of measuring the attaching amount of the binder will be described later.

The thermosetting resin to be used in the resin supply material1 will be described. The viscosity of the thermosetting resin for use during impregnation is preferably 1000 Pa·s or less, more preferably 100 Pa·s or less, still more preferably 10 Pa·s or less. When the viscosity is more than 1000 Pa·s, voids may be generated in the resulting fiber-reinforced resin because the later-described base material2 is not sufficiently impregnated with the thermosetting resin.

Examples of the kind of thermosetting resin preferably used include epoxy resins, vinyl ester resins, phenol resins, thermosetting polyimide resins, polyurethane resins, urea resins, melamine resins and bismaleimide resins. In addition to a single epoxy resin, a copolymer of an epoxy resin and a thermosetting resin, a modified product, a resin obtained by blending two or more kinds of resins and so on can be used.

The base material2 to be used in the preform is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers, or the like is preferably used. The continuous fiber means a reinforcing fiber in which a reinforcing fiber bundle is drawn and aligned in a continuous state without cutting the reinforcing fiber into short fibers. The form and the arrangement of reinforcing fibers to be used in the base material2 can be appropriately selected from continuous fiber forms such as a unidirectionally drawn and aligned long fiber, a fabric, a tow and a roving. The number of filaments in one fiber bundle to be used in the base material2 is preferably 500 or more, more preferably 1500 or more, still more preferably 2500 or more. The number of filaments in one fiber bundle is preferably 150000 or less, more preferably 100000 or less, still more preferably 70000 or less.

To obtain a fiber-reinforced resin having high dynamic characteristics, it is preferred that a fabric base material or unidirectional base material composed of continuous reinforcing fibers is used as the base material2, and to increase the thermosetting resin impregnation rate to improve productivity of the fiber-reinforced resin, it is preferred that a mat base material composed of discontinuous fibers is used as the base material2.

Examples of the method of producing a fiber-reinforced resin using the resin supply material1 include the following method. First, the preform 3 including the resin supply material 1 and the base material2 is prepared, and set on a metal mold. The resin supply material1 is softened on the metal mold at a high temperature, and the thermosetting resin is then supplied to the base material2 by pressurization.

The pressurization method is preferably press molding or vacuum-pressure molding. The temperature during supply of the resin and the temperature during curing may be the same, or different. A mold for molding may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside as described above). For the thermosetting resin, heating to a temperature at which the thermosetting resin is cured is performed after molding as necessary in addition to heating during molding so that the thermosetting resin is cured to obtain a fiber-reinforced resin.

Method of Measuring Molding Shrinkage Factor Pn and Molding Shrinkage Factor Ratio P of Resin Supply Material A circular resin supply material with a diameter of 100 mm is disposed in a female mold with a diameter of 100 mm at 23° C. In a non-pressurized state, the resin supply material is heated at a rate of 2° C./minute to be cured. After curing, the resin supply material is cooled to room temperature. A straight line passing through the center of gravity is drawn, and from this straight line, total six straight lines are drawn at intervals of 30° around the center of gravity. A straight line length Ln (mm) (n=1 to 6) between the edges of the resin supply material is measured, and a molding shrinkage factor Pn (n=1 to 6) is derived from formula (X). The maximum value $P_{MAX}$ and the minimum value $P_{MIN}$ of the molding shrinkage factor at the six points are extracted, and a molding shrinkage factor ratio P is derived from formula (I).

$$Pn=(100-Ln)/100(n=1 \text{ to } 6) \tag{X}$$

$$P=P_{MAX}/P_{MIN} \tag{I}$$

$P_{MAX}$: maximum molding shrinkage factor of resin supply material $P_{MIN}$: minimum molding shrinkage factor of resin supply material Method of Deriving Bending Hardness and Bending Length (Ratio) of Reinforcing Fiber Base Material The bending hardness and the bending length of the reinforcing fiber base material are determined in accordance with JIS L1913 (Cantilever Method, 2010). In one reinforcing fiber base material, a bending length Fn (n=1 to 6) is measured at total 6 points with intervals of 30° in the bending direction. The maximum value $F_{MAX}$ and the minimum value $F_{MIN}$ of the bending length are extracted, and a bending length ratio F is derived from formula (II).

$$F=F_{MAX}/F_{MIN} \tag{II}$$

$F_{MAX}$: maximum bending length of reinforcing fiber base material $F_{MIN}$: minimum bending length of reinforcing fiber base material Method of Measuring Bending Elastic Modulus and Bending Elastic Modulus Ratio E of Resin Supply Material The bending elastic modulus of a cured product obtained by curing the resin supply material is determined in accordance with JIS K7171 (2008). In one cured product, a bending elastic modulus En (n=1 to 6) is measured at total 6 points with intervals of 30° in the bending direction. The maximum value $E_{MAX}$ and the minimum value $E_{MIN}$ of the bending elastic modulus are extracted, and a bending elastic modulus ratio E is derived from formula (III).

$$E=E_{MAX}/E_{MIN} \tag{III}$$

$E_{MAX}$: maximum bending elastic modulus of cured product of resin supply material $E_{MIN}$: minimum bending elastic modulus of cured product of resin supply material Method of Deriving Average of Fiber Two-Dimensional Orientation Angles on X-Y Plane The average of fiber two-dimensional orientation angles on the X-Y plane is measured in steps I and II. As described above, the X axis, the Y axis and the Z axis are mutually orthogonal, the X-Y plane is in the base material plane, and the Z axis extends in the thickness direction of the base material.

I. An average of two-dimensional orientation angles with all reinforcing fiber monofilaments orthogonally crossing randomly selected reinforcing fiber monofilaments on the X-Y plane is measured. If there are many reinforcing fiber monofilaments crossing the reinforcing fiber monofilaments, an average measured for randomly selected 20 crossing reinforcing fiber monofilaments may be used alternatively.

II. The measurement in the step I is repeated five times in total for other reinforcing fiber monofilaments, and an average of the measured values is calculated as an average of fiber two-dimensional orientation angles.

The method of measuring an average of fiber two-dimensional orientation angles from a prepreg is not particularly limited, and mention may be made of, for example, a method in which the orientation of the reinforcing fiber base material is observed from a surface of a prepreg. It is preferred to polish the prepreg surface to expose the fibers for more easily observing the reinforcing fibers. Mention may also be made of, for example, a method in which the orientation of reinforcing fibers is observed using light passing through a prepreg. It is preferred to thinly slice the prepreg for more easily observing the reinforcing fibers. Mention may also be made of, for example, a method in which a prepreg is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fiber base material.

When it is difficult to perform measurement by the above-mentioned methods, mention may be made of, for example, a method in which the orientation of reinforcing fibers is observed after a resin is removed without collapsing the structure of the reinforcing fibers. For example, measurement can be performed in the following manner: a prepreg is sandwiched between two stainless meshes, and fixed by a screw so that the prepreg does not move, a resin component is then burned off, and the resulting reinforcing fiber base material is observed with an optical microscope or an electron microscope.

Method of Measuring Attaching Amount of Binder

The reinforcing fiber base material is weighed ($W_1$), and then left standing for 15 minutes in an electric furnace set at a temperature of 450° C. in a nitrogen flow at a rate of 50 liters/minute so that a binder is fully thermally decomposed. The reinforcing fiber base material is transferred to a container in a dry nitrogen flow at 20 liters/minute, cooled for 15 minutes, and then weighed ($W_2$), and a binder attaching amount is determined from the following formula.

binder attaching amount (%)=$(W_1-W_2)/W_1 \times 100$

EXAMPLES

Reference Example 1 (Reinforcing Fibers (Carbon Fibers))

From a copolymer mainly composed of PAN, continuous carbon fibers including total 12,000 monofilaments were prepared by performing spinning, a firing treatment and a surface oxidation treatment. The continuous carbon fibers had characteristics as shown below.
Monofilament diameter: 7 μm
Mass per unit length: 0.8 g/m
Specific gravity: 1.8
Tensile strength: 4600 MPa
Tensile elastic modulus: 220 GPa Reference Example 2 (Thermosetting Resin (Epoxy Resin (1))

An epoxy resin (1) was prepared using 40 parts by mass of "JER (registered trademark)" 1007 (manufactured by Mitsubishi Chemical Corporation), 20 parts by mass of "JER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator.

Reference Example 3 (Epoxy Resin Film)

Using a reverse roll coater, the epoxy resin (1) prepared in Reference Example 2 was applied onto a release paper to prepare resin films with masses per unit area of 37, 74 and 100 g/m², respectively.

Reference Example 4 (Reinforcing Fiber Base Material: Carbon Fiber Web (1))

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area so that a desired carbon fiber web (1) (reinforcing fiber base material) was prepared. The carbon fiber web (1) (weight per unit area of carbon fibers: 100 g/m²) had a bending length ratio F of 1.2, a bending hardness of 5 mN·cm at 25° C. and 4 mN·cm at 70° C., and a mean fiber length of 6.1 mm, and the average of fiber two-dimensional orientation angles on the X-Y plane of the carbon fiber web (1) was 45.3°.

Reference Example 5 (Reinforcing Fiber Base Material: Carbon Fiber Web (2))

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. About 5% by mass of a polyvinyl alcohol aqueous solution (KURARAY POVAL, manufactured by KURARAY CO., LTD) as a binder was deposited on the carbon fiber base material subjected to papermaking, and was dried in a drying furnace at 140° C. for 1 hour to prepare a desired carbon fiber web (2) (reinforcing fiber base material). The carbon fiber web (2) (weight per unit area of carbon fibers: 100 g/m²) had a bending length ratio F of 1.4, a bending hardness of 40 mN·cm at 25° C. and 25 mN·cm at 70° C., and a mean fiber length of 5.8 mm, and the average of fiber two-dimensional orientation angles on the X-Y plane of the carbon fiber web (2) was 47.3°.

Reference Example 6 (Reinforcing Fiber Base Material: Carbon Fiber Web (3))

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank that includes an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. About 15% by mass of a polyvinyl alcohol aqueous solution (KURARAY POVAL, manufactured by KURARAY CO., LTD) as a binder was deposited on the carbon fiber base material subjected to papermaking, and was dried in a drying furnace at 140° C. for 1 hour to prepare a desired carbon fiber web (3) (reinforcing fiber base material). The carbon fiber web (3) (weight per unit area of carbon fibers: 100 g/m$^2$) had a bending hardness of 200 mN·cm at 25° C. and 60 mN·cm at 70° C., and a mean fiber length of 5.9 mm, and the average of fiber two-dimensional orientation angles on the X-Y plane of the carbon fiber web (3) was 44.2°.

Reference Example 7 (Reinforcing Fiber Base Material: Carbon Fiber Sheet (1))

The carbon fiber bundle obtained in Reference Example 1 was cut to a length of 25 mm by a cartridge cutter to prepare a carbon fiber sheet (reinforcing fiber base material). The preparation process includes the following steps.

(1) A carbon fiber bundle having a length of 25 mm is uniformly dropped from a height of 20 cm, and scattered. (weight per unit area of carbon fibers: 100 g/m$^2$, size: 13.8×13.8 cm$^2$).

(2) About 5% by mass of a polyvinyl alcohol aqueous solution (KURARAY POVAL, manufactured by KURARAY CO., LTD) was deposited as a binder, and dried in a drying furnace at 140° C. for 1 hour to prepare a desired carbon fiber sheet (1).

The carbon fiber sheet (1) (weight per unit area of carbon fibers: 100 g/m$^2$) had a bending length ratio F of 3.1, and a mean fiber length of 25 mm, and the average of fiber two-dimensional orientation angles on the X-Y plane of the carbon fiber sheet (1) was 65.1°. Reference Example 8 (Reinforcing Fiber Base Material: Carbon Fiber Sheet (2))

The carbon fiber bundle obtained in Reference Example 1 was cut to a length of 25 mm by a cartridge cutter to prepare a carbon fiber sheet (reinforcing fiber base material). The preparation process includes the following steps.

(1) A carbon fiber bundle having a length of 25 mm is uniformly dropped from a height of 40 cm, and scattered (weight per unit area of carbon fibers: 100 g/m$^2$, size: 13.8×13.8 cm$^2$).

(2) About 5% by mass of a polyvinyl alcohol aqueous solution (KURARAY POVAL, manufactured by KURARAY CO., LTD) was deposited as a binder, and dried in a drying furnace at 140° C. for 1 hour to prepare a desired carbon fiber sheet (2).

The carbon fiber sheet (2) (weight per unit area of carbon fibers: 100 g/m$^2$) had a bending length ratio F of 1.8, a bending hardness of 60 mN·cm at 25° C. and 40 mN·cm at 70° C., and a mean fiber length of 25 mm, and the average of fiber two-dimensional orientation angles on the X-Y plane of the carbon fiber sheet (2) was 37.10.

Reference Example 9 (Resin Supply Material (1))

The carbon fiber web (1) obtained in Reference Example 4 was impregnated with the epoxy resin (1) prepared in Reference Example 2 so that a resin supply material (1) was prepared. The impregnation process includes the following steps.

(1) About 1000 g/m$^2$ of the epoxy resin film (size: 10×10 cm$^2$) obtained in Reference Example 3 is disposed on the web (size: 10×10 cm$^2$) obtained in Reference Example 4.

(2) Heating is performed at 0.1 MPa and 70° C. for about 1.5 hours.

The weight per unit area of carbon fibers was 100 g/m$^2$, the fiber volume content was 5%, the fiber weight content was 9%, and the thickness was 1.1 mm. A molding shrinkage factor of a cured product obtained by curing the resin supply material (1) was measured, and the result showed that the molding shrinkage factor ratio P was 1.3, and the bending elastic modulus ratio E was 1.3.

Reference Example 10 (Resin Supply Material (2))

The carbon fiber web (2) obtained in Reference Example 5 was impregnated with the epoxy resin (1) prepared in Reference Example 2 so that a resin supply material (2) was prepared. The impregnation process includes the following steps.

(1) About 1200 g/m$^2$ of the epoxy resin film (size: 10×10 cm$^2$) obtained in Reference Example 3 is disposed on the web (size: 10×10 cm$^2$) obtained in Reference Example 5.

(2) Heating is performed at 0.1 MPa and 70° C. for about 1.5 hours.

The weight per unit area of carbon fibers was 100 g/m$^2$, the fiber volume content was 4%, the fiber weight content was 8%, and the thickness was 1.4 mm. A molding shrinkage factor of a cured product obtained by curing the resin supply material (2) was measured, and the result showed that the molding shrinkage factor ratio P was 1.5, and the bending elastic modulus ratio E was 1.4.

Reference Example 11 (Resin Supply Material (3))

The carbon fiber web (3) obtained in Reference Example 6 was impregnated with the epoxy resin (1) prepared in Reference Example 2 so that a resin supply material (3) was prepared. The impregnation process includes the following steps.

(1) About 1850 g/m$^2$ of the epoxy resin film (size: 10×10 cm$^2$) obtained in Reference Example 3 is disposed on the web (size: 10×10 cm$^2$) obtained in Reference Example 6.

(2) Heating is performed at 0.1 MPa and 70° C. for about 1.5 hours.

The weight per unit area of carbon fibers was 100 g/m$^2$, the fiber volume content was 3%, the fiber weight content was 5%, and the thickness was 2.1 mm.

Reference Example 12 (Resin Supply Material (4))

The carbon fiber sheet (1) obtained in Reference Example 7 was impregnated with the epoxy resin (1) prepared in Reference Example 2 so that a resin supply material (4) was prepared. The impregnation process includes the following steps.

(1) About 200 g/m$^2$ of the epoxy resin film (size: 10×10 cm$^2$) obtained in Reference Example 3 is disposed on the carbon fiber sheet (size: 10×10 cm$^2$) obtained in Reference Example 7.

(2) Heating is performed at 0.1 MPa and 70° C. for about 1.5 hours.

The fiber volume content was 22%, the fiber weight content was 34%, and the thickness was 0.3 mm. A molding shrinkage factor of a cured product obtained by curing the resin supply material (4) was measured, and the result showed that the molding shrinkage factor ratio P was 5, and the bending elastic modulus ratio E was 2.5.

Reference Example 13 (Resin Supply Material (5))

The carbon fiber sheet (2) obtained in Reference Example 8 was impregnated with the epoxy resin (1) prepared in Reference Example 2 so that a resin supply material (5) was prepared. The impregnation process includes the following steps.

(1) About 200 g/m² of the epoxy resin film (size: 10×10 cm²) obtained in Reference Example 3 is disposed on the carbon fiber sheet (size: 10×10 cm²) obtained in Reference Example 7.

(2) Heating is performed at 0.1 MPa and 70° C. for about 1.5 hours.

The fiber volume content was 21%, the fiber weight content was 33%, and the thickness was 0.3 mm. A molding shrinkage factor of a cured product obtained by curing the resin supply material (5) was measured, and the result showed that the molding shrinkage factor ratio P was 1.7, and the bending elastic modulus ratio E was 1.8.

Evaluation criteria on warpage of the molded article in the following examples and comparative examples are as follows. A sample having a warpage ratio of 0.5% or more was evaluated as having warpage, and a sample having a warpage ratio of less than 0.5% was evaluated as having no warpage, the warpage ratio being measured in accordance with JIS K6911 (2006). Evaluation criteria on wrinkles on the molded article are as follows. A sample having a maximum height Rz of 50 µm or more was evaluated as having wrinkles, and a sample having a maximum height Rz of less than 50 µm was evaluated as having no wrinkles, the maximum Rz being measured in accordance with JIS B0601 (2001).

Example 1

A flat plate was prepared using the resin supply material (1) obtained in Reference Example 9 and a dry fabric (Cloth manufactured by Toray Industries, Inc., grade: CO6343B, plain fabric, weight per unit area of carbon fibers: 198 g/m²). The molding process includes the following steps.

(1) The resin supply material (1) (weight per unit area of carbon fibers: 200 g/m², size: 13.8×13.8 cm²) is prepared by superimposing two resin supply materials on each other such that the X axis of one resin supply material (1) coincides with the Y axis of the other resin supply material (1).

(2) One dry fabric layer is disposed on each of front and back surfaces of the obtained resin supply material (1).

(3) The laminate in the step (2) is preheated at zero pressure and 70° C. for about 10 minutes using a press machine.

(4) The laminate is pressurized at 1 MPa.

(5) The laminate is heated to 150° C. at a rate of 3° C./minute, and then held for 40 minutes to be cured.

As shown in Table 2, a molded article having no warpage was obtained.

Example 2

A flat plate was prepared using the resin supply material (2) obtained in Reference Example 10 and a dry fabric (Cloth manufactured by Toray Industries, Inc., grade: CO6343B, plain fabric, weight per unit area of carbon fibers: 198 g/m²). The molding process includes the following steps.

(1) The resin supply material (2) (weight per unit area of carbon fibers: 200 g/m², size: 13.8×13.8 cm²) is prepared by superimposing two resin supply materials on each other such that the X axis of one resin supply material (2) coincides with the Y axis of the other resin supply material (2).

(2) One dry fabric layer is disposed on each of front and back surfaces of the obtained resin supply material (2).

(3) The laminate in the step (2) is preheated at zero pressure and 70° C. for about 10 minutes using a press machine.

(4) The laminate is pressurized at 1 MPa.

(5) The laminate is heated to 150° C. at a rate of 3° C./minute, and then held for 40 minutes to be cured.

As shown in Table 2, a molded article having no warpage was obtained.

Example 3

A molded article having a curved surface shape with a curvature radius of 50 mm was prepared using the resin supply material (1) obtained in Reference Example 9 and a dry fabric (Cloth manufactured by Toray Industries, Inc., grade: CO6343B, plain fabric, weight per unit area of carbon fibers: 198 g/m²).

(1) Two dry fabric layers are disposed on each of front and back surfaces of the resin supply material (1) (weight per unit area of carbon fibers: 100 g/m², size: 13.8×13.8 cm²).

(2) The laminate in the step (1) is disposed in a metal mold having a curved shape with a curvature radius of 50 mm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

As shown in Table 3, the molded article had no wrinkles on the surface layer portion.

Example 4

A molded article having a curved surface shape with a curvature radius of 50 mm was prepared using the resin supply material (2) obtained in Reference Example 10 and a dry fabric (Cloth manufactured by Toray Industries, Inc., grade: CO6343B, plain fabric, weight per unit area of carbon fibers: 198 g/m²).

(1) Two dry fabric layers are disposed on each of front and back surfaces of the resin supply material (2) (weight per unit areas of carbon fibers: 100 g/m², size: 13.8×13.8 cm²).

(2) The laminate in the step (1) is disposed in a metal mold having a curved shape with a curvature radius of 50 mm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

As shown in Table 3, the molded article had no wrinkles on the surface layer portion.

Comparative Example 1

A flat plate was prepared using the resin supply material (4) obtained in Reference Example 12 and a dry fabric (Cloth manufactured by Toray Industries, Inc., grade: CO6343B, plain fabric, weight per unit area of carbon fibers: 198 g/m²). The molding process includes the following steps.

(1) The resin supply material (4) (weight per unit area of carbon fibers: 200 g/m², size: 13.8×13.8 cm²) is prepared by superimposing two resin supply materials on each other such that the X axis of one resin supply material (4) coincides with the Y axis of the other resin supply material (4).

(2) One dry fabric layer is disposed on each of front and back surfaces of the obtained resin supply material (4).

(3) The laminate in the step (2) is preheated at zero pressure and 70° C. for about 10 minutes using a press machine.

(4) The laminate is pressurized at 1 MPa.

(5) The laminate is heated to 150° C. at a rate of 3° C./minute, and then held for 40 minutes to be cured.

As shown in Table 2, the molded article had warpage.

Comparative Example 2

A flat plate was prepared using the resin supply material (5) obtained in Reference Example 13 and a dry fabric (Cloth manufactured by Toray Industries, Inc., grade: CO6343B, plain fabric, weight per unit area of carbon fibers: 198 g/m$^2$). The molding process includes the following steps.

(1) The resin supply material (5) (weight per unit area of carbon fibers: 200 g/m$^2$, size: 13.8×13.8 cm$^2$) is prepared by superimposing two resin supply materials on each other such that the X axis of one resin supply material (5) coincides with the Y axis of the other resin supply material (5).

(2) One dry fabric layer is disposed on each of front and back surfaces of the obtained resin supply material (5).

(3) The laminate in the step (2) is preheated at zero pressure and 70° C. for about 10 minutes using a press machine.

(4) The laminate is pressurized at 1 MPa.

(5) The laminate is heated to 150° C. at a rate of 3° C./minute, and then held for 40 minutes to be cured.

As shown in Table 2, the molded article had warpage.

Comparative Example 3

A molded article having a curved surface shape with a curvature radius of 50 mm was prepared using the resin supply material (3) obtained in Reference Example 11 and a dry fabric (Cloth manufactured by Toray Industries, Inc., grade: CO6343B, plain fabric, weight per unit area of carbon fibers: 198 g/m$^2$).

(1) Two dry fabric layers are disposed on each of front and back surfaces of the resin supply material (3) (weight per unit areas of carbon fibers: 100 g/m$^2$, size: 13.8×13.8 cm$^2$).

(2) The laminate in the step (1) is disposed in a metal mold having a curved shape with a curvature radius of 50 mm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

As shown in Table 3, the molded article had wrinkles on the surface layer.

Comparative Example 4

A molded article having a curved surface shape with a curvature radius of 50 mm was prepared using the resin supply material (5) obtained in Reference Example 13 and a dry fabric (Cloth manufactured by Toray Industries, Inc., grade: CO6343B, plain fabric, weight per unit area of carbon fibers: 198 g/m$^2$).

(1) Two dry fabric layers are disposed on each of front and back surfaces of the resin supply material (5) (weight per unit areas of carbon fibers: 100 g/m$^2$, size: 13.8×13.8 cm$^2$).

(2) The laminate in the step (1) is disposed in a metal mold having a curved shape with a curvature radius of 50 mm, and preheated at zero pressure and 70° C. for about 10 minutes.

(3) The laminate is pressurized at 1 MPa.

(4) The laminate is heated to 150° C. at a rate of 3° C./minute, and then held for 40 minutes to be cured.

As shown in Table 3, the molded article had wrinkles on the surface layer.

TABLE 2

| | Resin supply material | | | | | | | | | | | | |
|---|---|---|---|---|---|---|---|---|---|---|---|---|---|
| | | | | Reinforcing fiber base material | | | | | | | Thermosetting resin | | |
| | Reference Example | Molding shrinkage factor ratio P | Bending elastic modulus ratio E | Resin supply material thickness (mm) | Vfi (%) | Reference Example | Bending length ratio F | Average of fiber two-dimensional orientation angles on X-Y plane (degrees) | Kind of fiber | Weight per unit area of fibers (g/m$^2$) | Fiber length (mm) | Kind of resin | Weight per unit area (g/m$^2$) | Molded article |
| Example 1 | 9 | 1.3 | 1.3 | 1.1 | 5 | 4 | 1.2 | 45.3 | CF | 100 | 6.1 | Epoxy | 1000 | Not warped |
| Example 2 | 10 | 1.5 | 1.4 | 1.4 | 4 | 5 | 1.4 | 47.3 | CF | 100 | 5.8 | Epoxy | 1200 | Not warped |
| Comparative Example 1 | 12 | 5 | 2.5 | 0.3 | 22 | 7 | 3.1 | 65.1 | CF | 100 | 25 | Epoxy | 200 | Warped |
| Comparative Example 2 | 13 | 17 | 1.8 | 0.3 | 21 | 8 | 1.8 | 37.1 | CF | 100 | 25 | Epoxy | 200 | Warped |

TABLE 3

| | | | Resin supply material | | | | | | | | | |
|---|---|---|---|---|---|---|---|---|---|---|---|---|
| | | | Reinforcing fiber base material | | | | | | Thermosetting resin | | | |
| | Reference Example | Reference Example | Bending hardness (mN · cm) | | Average of fiber two-dimensional orientation angles on X-Y plane (degrees) | Kind of fiber | Weight per unit area of fibers (g/m²) | Fiber length (mm) | Kind of resin | Weight per unit area (g/m²) | Thickness of resin supply material (mm) | Vf (%) | Molded article |
| | | | 25° C. | 70° C. | | | | | | | | | |
| Example 3 | 9 | 4 | 5 | 4 | 45.3 | CF | 100 | 6.1 | Epoxy | 1000 | 1.1 | 5 | Not wrinkled |
| Example 4 | 10 | 5 | 40 | 25 | 47.3 | CF | 100 | 5.8 | Epoxy | 1200 | 1.4 | 4 | Not wrinkled |
| Comparative Example 3 | 11 | 6 | 200 | 60 | 44.2 | CF | 100 | 5.9 | Epoxy | 1850 | 2.1 | 3 | Wrinkled |
| Comparative Example 4 | 13 | 8 | 60 | 40 | 37.1 | CF | 100 | 25 | Epoxy | 200 | 0.3 | 21 | Wrinkled |

INDUSTRIAL APPLICABILITY

A resin supply material, and a method of producing a fiber-reinforced resin using the resin supply material are suitably used in sports applications, general industrial applications and aerospace applications. More specifically, the general industrial applications include electronic device members and repairing/reinforcing materials such as structural materials and sub-structural materials for automobiles, watercraft, windmills and so on, roof materials, and cases (housings) for IC trays and notebook personal computers. The aerospace applications include structural materials and sub-structural materials for aircraft, rockets and artificial satellites.

The invention claimed is:

1. A resin supply material used for press molding or vacuum-pressure molding of a fiber-reinforced resin, the resin supply material having a thickness of 1.5 mm or more and comprising a reinforcing fiber base material and a thermosetting resin, wherein a tensile rupture strain of the reinforcing fiber base material is 5% or more at temperature T Temperature T: temperature at which the viscosity of the thermosetting resin is minimum in heating of the thermosetting resin at a temperature elevation rate of 1.5° C./minute from 40° C.

2. The resin supply material according to claim 1, wherein an average of fiber two-dimensional orientation angles on a plane orthogonal to the X-Y plane of reinforcing fibers in the reinforcing fiber base material is 5 to 85 degrees.

3. The resin supply material according to claim 1, wherein an average of fiber two-dimensional orientation angles on the X-Y plane of reinforcing fibers in the reinforcing fiber base material is 5 degrees or more.

4. The resin supply material according to claim 1, wherein the reinforcing fiber in the reinforcing fiber base material is at least one selected from a glass fiber, a carbon fiber, an aramid fiber and a metal fiber.

5. The resin supply material according to claim 1, wherein a mean fiber length of the reinforcing fibers in the reinforcing fiber base material is 0.1 to 100 mm.

6. A preform comprising the resin supply material according to claim 1, and a base material.

7. The preform according to claim 6, wherein the base material is at least one selected from a fabric base material, a unidirectional base material and a mat base material each composed of reinforcing fibers.

8. A method of producing a fiber-reinforced resin, the method comprising molding a fiber-reinforced resin by heating and pressurizing the preform according to claim 6.

9. A preform comprising the resin supply material according to claim 1, and at least one base material selected from a sheet-shaped base material, a cloth-shaped base material and a porous base material.

10. The resin supply material according to claim 1, wherein a tensile strength of the reinforcing fiber base material is 0.5 MPa or more at the temperature T.

11. The resin supply material according to claim 1, wherein the reinforcing fiber base material is composed of discontinuous fibers.

12. The resin supply material according to claim 1, wherein the reinforcing fiber base material is a non-woven fabric in which carbon fibers are opened, and monofilaments are bonded together by a binder composed of an organic compound.

13. The resin supply material according to claim 1, wherein a fiber weight content Wfi of the resin supply material as expressed by formula (V) is 30% or less:

$$Wfi = Wf1/(Wf1+Wr1) \times 100(\%) \ldots \quad (V)$$

Wf1: fiber weight (g) in resin supply material
Wr1: resin weight (g) in resin supply material.

14. The resin supply material according to claim 1, wherein a fiber weight content Wfi of the resin supply material as expressed by formula (V) is 22% or less:

$$Wfi = Wf1/(Wf1+Wr1) \times 100(\%) \ldots \quad (V)$$

Wf1: fiber weight (g) in resin supply material
Wr1: resin weight (g) in resin supply material.

15. The resin supply material according to claim 1, wherein fibers in the reinforcing fiber base material are bonded together by a binder, and an attaching amount of the binder is 1 to 20% by mass relative to a total amount of the reinforcing fiber base material.

16. The resin supply material according to claim 15, wherein the binder is a thermoplastic resin.

17. The resin supply material according to claim 16, wherein the binder is a polyamide-based resin.

18. A resin supply material used for press molding or vacuum-pressure molding of a fiber-reinforced resin, the resin supply material having a thickness of 1.5 mm or more and comprising a reinforcing fiber base material and a thermosetting resin, wherein a molding shrinkage factor ratio P expressed by formula (I) is 1 to 1.5, and an average of fiber two-dimensional orientation angles on the X-Y plane of reinforcing fibers in the reinforcing fiber base material is 30 to 60 degrees:

$$P = P_{MAX}/P_{MIN} \ldots \quad (I)$$

$P_{MAX}$: maximum molding shrinkage factor of resin supply material $P_{MIN}$: minimum molding shrinkage factor of resin supply material.

19. The resin supply material according to claim 18, wherein the reinforcing fiber base material has a bending hardness of 30 mN1-cm or less at 70° C.

20. The resin supply material according to claim 18, wherein a bending length ratio F of the reinforcing fiber base material as expressed by formula (II) is 1 to 1.5

$$F = F_{MAX}/F_{MIN} \ldots \quad (II)$$

$FM_{MAX}$: maximum bending length of reinforcing fiber base material $F_{MIN}$: minimum bending length of reinforcing fiber base material.

21. The resin supply material according to claim 18, wherein a bending elastic modulus ratio E of a cured product obtained by curing the resin supply material is 1 to 1.5, the bending elastic modulus ratio E being expressed by formula (IV)

$$E \ E_{MAX}/E_{MIN} \ldots \quad (IV)$$

$E_{MAX}$: maximum bending elastic modulus of cured product of resin supply material $E_{MIN}$: minimum bending elastic modulus of cured product of resin supply material.

22. The resin supply material according to claim 18, wherein the reinforcing fiber in the reinforcing fiber base material is at least one selected from a glass fiber, a carbon fiber, an aramid fiber and a metal fiber.

23. The resin supply material according to claim 18, wherein a mean fiber length of the reinforcing fibers in the reinforcing fiber base material is 0.1 to 100 mm.

24. A preform comprising the resin supply material according to claim 18, and a base material.

25. A method of producing a fiber-reinforced resin, the method comprising molding a fiber-reinforced resin by heating and pressurizing the preform according to claim 24 to supply a thermosetting resin from the resin supply material to the base material.

26. A resin supply material used for press molding or vacuum-pressure molding of a fiber-reinforced resin, the resin supply material having a thickness of 1.5 mm or more and comprising a reinforcing fiber base material and a thermosetting resin, wherein
 the resin supply material meets any of Requirements (1), (2) and (3), and
 an average of fiber two-dimensional orientation angles on the X-Y plane of reinforcing fibers in the reinforcing fiber base material is 30 to 60 degrees:
 (1) a bending hardness of the reinforcing fiber base material at 25° C. is 50 mN·cm or less,
 (2) a bending length ratio F of the reinforcing fiber base material is 1 to 1.5, the bending length ratio F being expressed by formula (III):

$$F = F_{MAX}/F_{MIN} \ldots \quad (III)$$

$F_{MAX}$: maximum bending length of reinforcing fiber base material
 $F_{MIN}$: minimum bending length of reinforcing fiber base material,
 (3) a bending elastic modulus ratio E of a cured product obtained by curing the resin supply material is 1 to 1.5, the bending elastic modulus ratio E being expressed by formula (IV):

$$E = E_{MAX}/E_{MIN} \ldots \quad (IV)$$

$E_{MAX}$: maximum bending elastic modulus of cured product of resin supply material
 $E_{MIN}$: minimum bending elastic modulus of cured product of resin supply material.

27. The resin supply material according to claim 26, wherein the reinforcing fiber in the reinforcing fiber base material is at least one selected from a glass fiber, a carbon fiber, an aramid fiber and a metal fiber.

28. The resin supply material according to claim 26, wherein a mean fiber length of the reinforcing fibers in the reinforcing fiber base material is 0.1 to 100 mm.

29. A preform comprising the resin supply material according to claim 26, and a base material.

30. A method of producing a fiber-reinforced resin, the method comprising molding a fiber-reinforced resin by heating and pressurizing the preform according to claim 29 to supply a thermosetting resin from the resin supply material to the base material.

* * * * *